United States Patent [19]

Varnelis et al.

[11] Patent Number: 4,607,977

[45] Date of Patent: Aug. 26, 1986

[54] PIVOT JOINT

[76] Inventors: Edmund K. Varnelis, 1568 Trebor Rd., St. Joseph, Mich. 49085; Robert L. Siewert, 1515 Moccasin Trail, Benton Harbor, Mich. 49022

[21] Appl. No.: 762,232

[22] Filed: Aug. 5, 1985

[51] Int. Cl.[4] .......................... F16C 11/06; F16D 1/12
[52] U.S. Cl. .................................. 403/154; 403/158; 29/526 R
[58] Field of Search ........................ 403/158, 157, 154; 29/526 R, 463, 464

[56] References Cited

U.S. PATENT DOCUMENTS

| | | |
|---|---|---|
| 3,336,089 | 8/1967 | Krickler . |
| 3,554,588 | 1/1971 | Reinsma et al. . |
| 3,904,299 | 9/1975 | Loonis et al. ....................... 403/157 |
| 3,957,381 | 5/1976 | Schafer . |
| 4,096,957 | 6/1978 | Iverson et al. . |
| 4,188,146 | 2/1980 | Stecklein . |
| 4,243,341 | 1/1981 | Kabay et al. ................... 403/158 X |
| 4,251,182 | 2/1981 | Schroeder . |
| 4,400,898 | 8/1983 | Christensen et al. ........... 403/157 X |

OTHER PUBLICATIONS

International Publication No. WO 82/00181.

*Primary Examiner*—Andrew V. Kundrat

[57] ABSTRACT

A joint for connecting two structural members of a machine for pivotal movement relative to each other, one of the frame members including a bifurcated portion having spaced-apart parallel flanges, such flanges having equal diameter coaxial openings through them. The other frame member is located in part between the parallel flanges and has a third opening through it coaxial with the other openings. Thrust bushings and thrust plates are utilized to absorb thrust loads on the joint, and one of the thrust plates is held from circumferential movement relative to one of the flanges by means of a weld bead on such flange which mates with a radial slot in the thrust plate.

8 Claims, 11 Drawing Figures

PIVOT JOINT

BACKGROUND OF THE INVENTION

1. Field of the Disclosure

This invention relates to a joint which connects together two parts of a vehicle or other machine for pivotal movement relative to each other.

2. Description of the Prior Art

U.S. Pat. No. 3,336,089 Krickler discloses a pivot joint mechanism which joins two adjacent links of an endless track for pivotal movement relative to each other. The two joined ends of the links are both bifurcated. A link extends between the bifurcated end portions of one link, and a pair of friction plates and wear discs are secured to the pin adjacent the ends respectively; these parts move as a unit. The other link extends between the bifurcated end portions of the other link and has a hollow bushing with a pair of thrust washers and seals secured to ends of the hollow bushing respectively; these parts also move as a unit. The inner surface of the bushing and the other surface of the pin interface to provide a dynamic lubricated oscillatory connection between the two links.

U.S. Pat. No. 3,554,588 Reinsma et al discloses a cartridge type hinge assembly for articulately connecting one member with the bifurcated end of another member comprising a solid pin element, bushings welded to said element adjacent each of its ends and spaced for reception in openings in the bifurcated end, and a third bushing rotatable on the pin between the spaced bushings and positioned for reception in an opening in said one member.

U.S. Pat. No. 3,957,381 Schafer discloses a coaxial, double-cone, frictional hub-to-shaft connector wherein the connector includes a flanged clamping ring and an unflanged clamping ring. One ring is received within the other. Tightening screws tighten the connector by drawing the rings together in the axial direction. Each ring has an inner and an outer surface. The inner surface of the outer ring and the outer surface of the inner ring are conical surfaces which engage each other when the rings are drawn together in the axial direction. The other surface of at least one of the rings is a clamping surface adapted to engage with a clamp action a complementarily configured surface of a shaft or collar when the rings are drawn together in the axial direction. The unflanged ring at the axial end thereof facing towards the flange is provided, intermediate the inner surface of the unflanged ring and the outer surface of the flanged ring, with an inclined conical intermediate surface. The flange has an inner surface which faces towards and is substantially parallel to the inclined conical intermediate surface of the unflanged ring.

U.S. Pat. No. 4,096,957 Iverson et al discloses a pivot pin assembly for mounting a loader bucket to a loader arm of a tractor. The pivot pin assembly includes a cylindrical pin having spaced-apart retaining sleeves which capture a sleeve bearing therebetween. The retaining sleeves engage the bucket bracket assembly and the bearing engages the loader arm assembly. Flanges on one retaining sleeve engage the bucket bracket assembly to restrict axial movement of the pin in one direction. A cover plate, secured to the bucket bracket over the flanges, restricts axial movement of the pin in the other direction. The flanges define two spaced-apart sides which are retained in a channel on the cover plate to prevent rotational movement of the pin with respect to the loader bucket. The pivot pin assembly may be removed by detaching the cover plate and pulling the pin from the bucket bracket assembly and the loader arm assembly.

U.S. Pat. No. 4,188,146 Stecklein discloses an articulated joint including Belleville spring seal maintained in a preselected compressed state wherein a first member includes a pair of parallel portions disposed on opposite sides of a second member and pivotally interconnected thereto by means of a pivot pin assembly including aligned holes in the parallel portions and the second member. The pivot assembly further includes a bushing received in the hole in the second member and a pin received in the bushing and in the holes in the parallel portions. Received on one end of the pin and welded thereto to form an integral part thereof is a collar while a cap is secured over the other end of the pin by a cap screw. First and second flat washers are respectively received on the pin at the inner ends of the collar and cap and are held against opposite sides of the second member and against first and second pairs of opposed Belleville springs located at the opposite ends of the bushing.

U.S. Pat. No. 4,251,182 Schroeder discloses a serviceable pivot pin assembly for pivotal mounting of a bucket on a boom arm, said bucket having a pair of brackets secured thereto and said boom arm having a transverse bore. The assembly comprises bearings retained in said transverse bore, a pin having an enlarged head extending through said brackets and rotatable in said bearings, a thrust ring on the end of said pin and an end plate. Releasable securing means connect said pin, said thrust ring, said end plate and said bracket as a unit to rotate on said bearings.

International Publication No. WO 82/00181 under the Patent Cooperation Treaty discloses in FIG. 4 a pivot joint including a pivot pin which extends between the flanges of a bifurcated structural member and is locked to them. There are two annular thrust rings on the pin and they are secured to it as by a press fit. A second structural member is located between the flanges for pivotal movement relative to the bifurcated member. The second structural member has an opening through it which is occupied by a bushing which extends between said thrust rings, forming a dynamic joint. There are two annular seals, each providing a dynamic seal connection with one of the thrust rings and a static seal connection with said structural member.

SUMMARY OF THE INVENTION

The present invention is a joint for connecting together two structural members of a vehicle for pivotal movement relative to each other. One of the structural members includes a bifurcated portion having spaced apart parallel flanges, such flanges having equal diameter coaxial openings through them. The other structural member is located in part between the parallel flanges and has a third opening through it which is coaxial with the other said openings. A pin extends through all three of the openings and a pair of bushings is located in said third opening and around the pin in dynamic contact with the pin. Each bushing has an axially extending shoulder portion projecting beyond the margins of the third opening respectively, and a pair of annular thrust plates are housed within said shoulder portions respectively. One of the thrust plates has a radial slot in the outer surface thereof, and there is a weld bead on one flange of the first member located in the radial slot to keep the thrust plate from rotating relative to the flange with which it is associated.

DESCRIPTION OF THE PREFERRED EMBODIMENT

Figure 1:
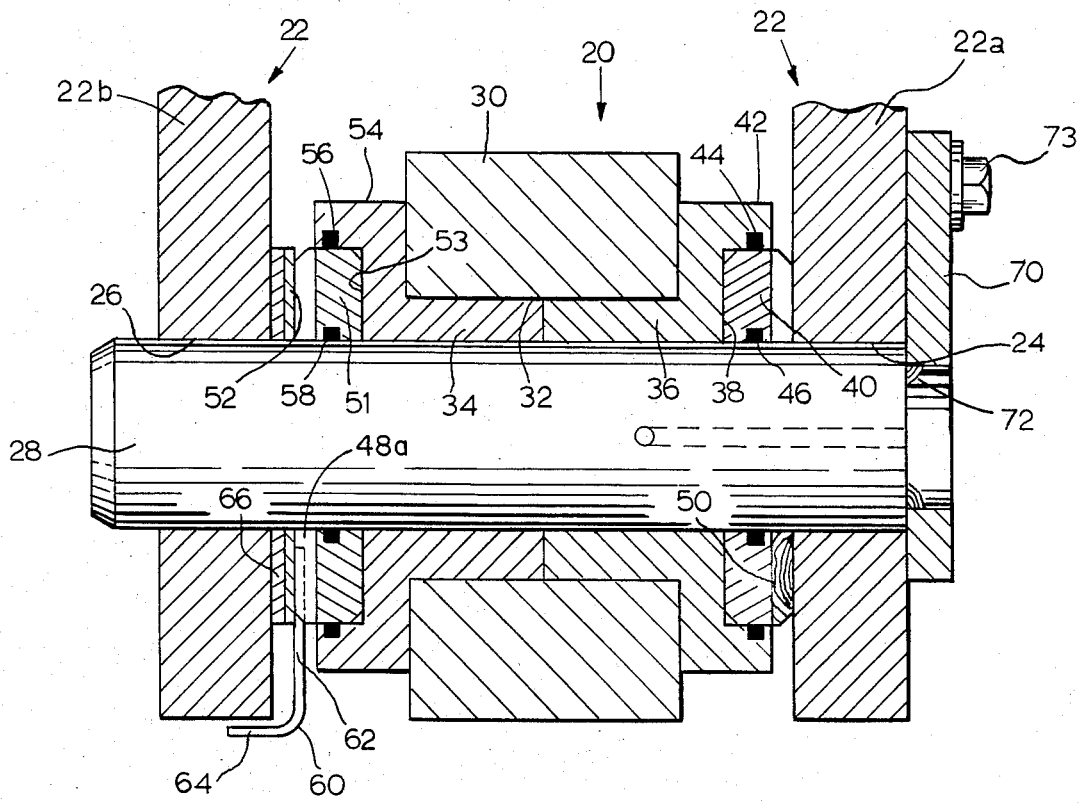
FIG. 1 is a partial sectional view through a vehicle pivot joint embodying the present invention.

The numeral 20 in FIG. 1 indicates generally a vehicle pivot joint according to the present invention. It connects together two parts of a vehicle which pivot relative to each other during operation of the vehicle. One part of the vehicle includes a frame member, indicated at 22, which is bifurcated, having two spaced flanged portions 22a and 22b. The two flanged portions have equal diameter coaxial openings 24 and 26 respectively through which a pin 28 extends in the assembled pivot joint.

The other part of the vehicle which is pivoted relative to the bifurcated portion is indicated at 30, and it may be a cradle which connects the pivoted rear axle of an articulated loader to the frame. Member 30 has an opening 32 through it and the three openings 24, 32 and 26 are coaxial.

Figure 9:
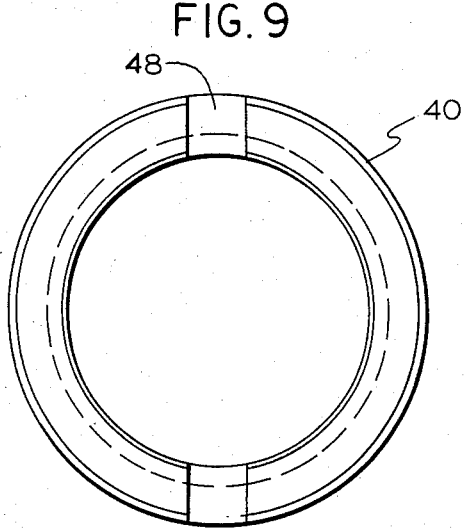
FIG. 9 is another view of the thrust plate of FIG. 8.

There is a pair of thrust bushings 34 and 36 which in the assembled condition of the pivoted joint are located within said opening 32 in frame member 30, surrounding said pin in dynamic contact with the pin. See FIG. 5 for a sectional view of thrust bushing 36. It will be seen from FIG. 5 that thrust bushing 36 includes a thrust surface 38 which is in dynamic contact with a thrust plate 40 (see FIG. 1) to absorb the thrust of axial forces which cause thrust plate 40 to push against surface 38. Thrust bushing 36 also has a shoulder portion 42 which houses within it thrust plate 40. A seal 44 in a groove in shoulder 42 seals in lubricant which is transmitted into the pivot joint through grooves 82 and 84 in the inner annular surface 37 of bushing 36. There is also a static seal 46 carried by thrust plate 40 which has a static sealing connection with pin 28. Thrust plate 40 has a radial slot 48 as shown in FIG. 9 which when the joint is assembled receives a weld bead 50 which is radially disposed on flange 22a. There may be two oppositely positioned slots as illustrated in FIG. 9. "Weld bead" as used herein means a ridge of metal which is deposited on the inner flat surface of flange 22a by fusion using a welding machine.

Figure 10:
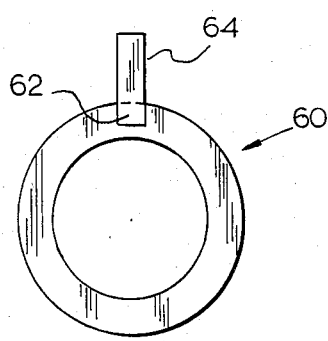
FIG. 10 is a view of a shim.
Figure 11:
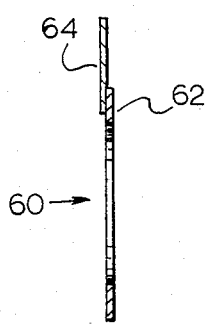
FIG. 11 is another view of the shim of FIG. 10.

The bushing 34 is the same as bushing 36 except in mirror image. It includes a thrust surface 53, a shoulder portion 54, a dynamic seal 56, and a static seal 58. However, the manner in which thrust plate 51 is secured to frame member 22b differs from the other part of the joint previously described in that there is a shim 60 having a flat portion 62 to which stem portion 64 is secured. See FIGS. 10 and 11. There may also be another conventional shim 66 between shim 60 and flange 22b.

The assembly of joint 20 is initiated with the cradle or other structural member 30 separated from bifurcated frame member 22. First the annular thrust bushings 34 and 36 are put in place from opposite ends of opening 32 which extends through member 30. Such bushings after such installation have outwardly facing thrust surfaces 38 and 53 respectively and outwardly disposed shoulder portions 42 and 54 respectively. Then thrust plates 40,51 are installed within the thrust bushings 36 and 34 respectively in a manner such that each of said thrust plates abuts one of the outwardly facing thrust surfaces 38 or 53. The seals 44 and 56 are put in place in the respective thrust bushings before the thrust plates 40 and 51 are inserted in the respective thrust bushings within the shoulder portions 42 and 54 respectively. Static seals 46 and 58 are inserted in thrust plates 40 and 51 before the assembly of the thrust plates with their respective thrust bushings. Next shims 60 and 66 are put in place with shim 60 in contact with surface 52 of shim 66 and the stem portion 64 on shim 60 straight, that is, not bent at a 90° angle as shown in FIG. 1 but instead in the condition illustrated in FIGS. 10 and 11.

Then, the flanges 22a and 22b of bifurcated frame member 22 are located adjacent thrust plate 40 and thrust plate 51 respectively, with the slot 48 in thrust plate 40 and weld bead 50 aligned radially. Then the bifurcated member 22 is moved to the position illustrated in FIG. 1 by moving weld bead 50 into one of said slots 48 so that such slot and the weld bead are in mating relationship. At the same time stem 64 moves into slot 48a in thrust plate 51. Then pin 28 is inserted axially to hold the pivot joint together. The shim 66 may be of varying thickness to accommodate readily the two parts of the pivot joint during assembly and during operation; a shim 66 is used which is thick enough to assure that weld bead 50 cannot escape from slot 48, whereby thrust plate 40 is held from circumferential movement relative to flanged portion 22a. Stem portion 64 of shim 60 is bent over as shown in FIG. 1 to prevent shim 60 from moving circumferentially relative to flange 22b.

Figure 4:
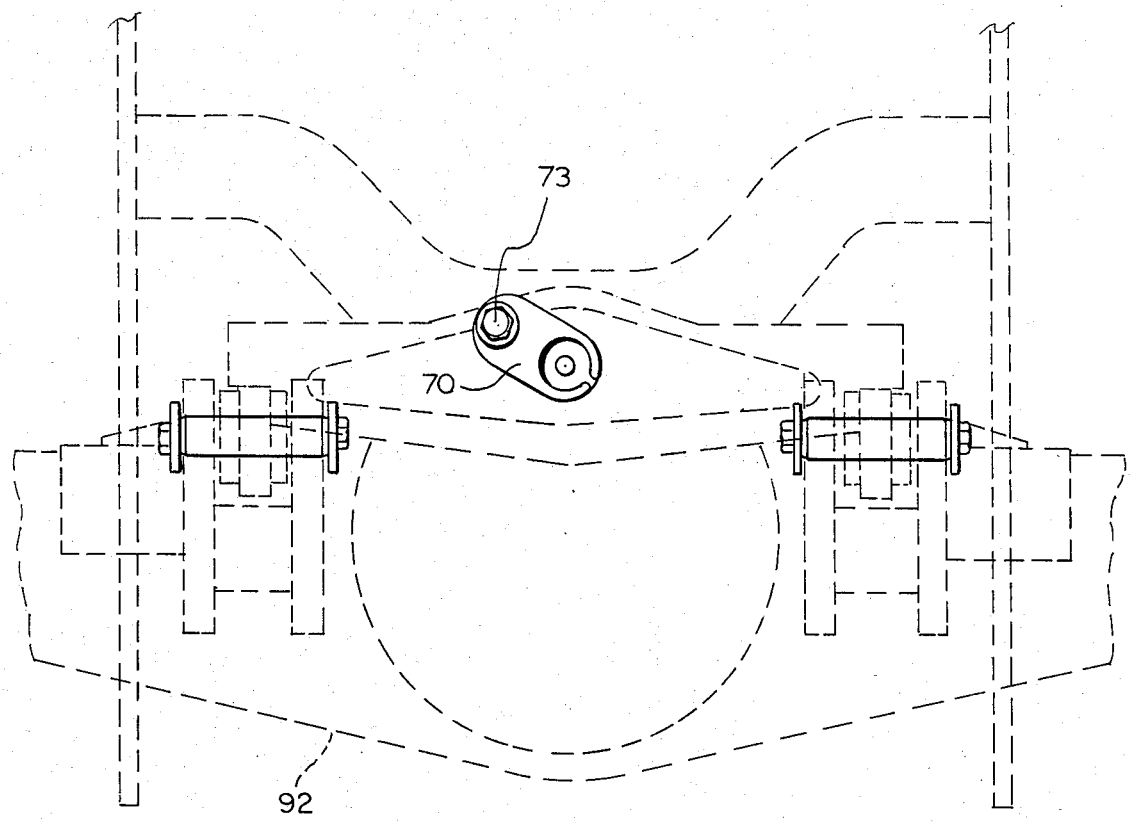
FIG. 4 is a diagrammatic end view of the structure of FIG. 2.

Pin 28 is secured to flange 22a by means of a head portion 70 which may be secured to pin 28 such as by welding at 72. The member 70 is secured to flange 22a by means of a machine screw 73 which passes through plate 70 and is threaded into flange 22a. See FIG. 4.

Figure 5:
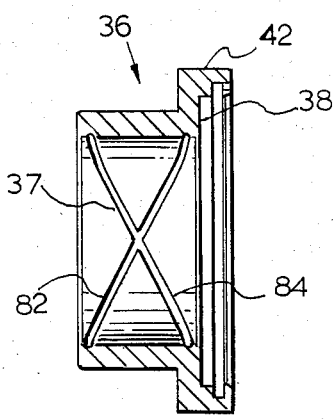
FIG. 5 is a sectional view of one of the thrust bushings of FIG. 1.
Figure 6:
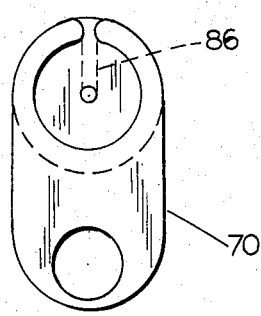
FIG. 6 is a view of a pin retainment portion on a pivot pin.
Figure 7:
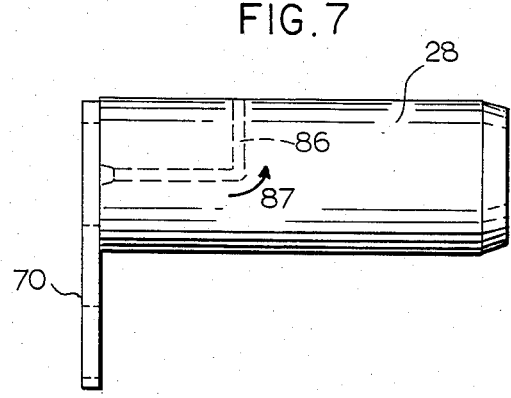
FIG. 7 shows another view of the retainment portion of FIG. 6.
Figure 8:
FIG. 8 is a section of a thrust plate which is used in this invention.

As illustrated in FIG. 5, there may be lubricant grooves 82 and 84 in the inner surfaces of thrust bushings 34 and 36 respectively to lubricate the dynamic joints between bushings 34 and 36 respectively and pin 28, and also the dynamic thrust surfaces 38 and 53. As indicated in FIGS. 6 and 7 there is a lubricant passage 86 in pin 28 which allows lubricant to be inserted through passage 86 into the joint between the two thrust bushings and the pin. This is illustrated by the arrow 87 in FIG. 7.

Figure 2:
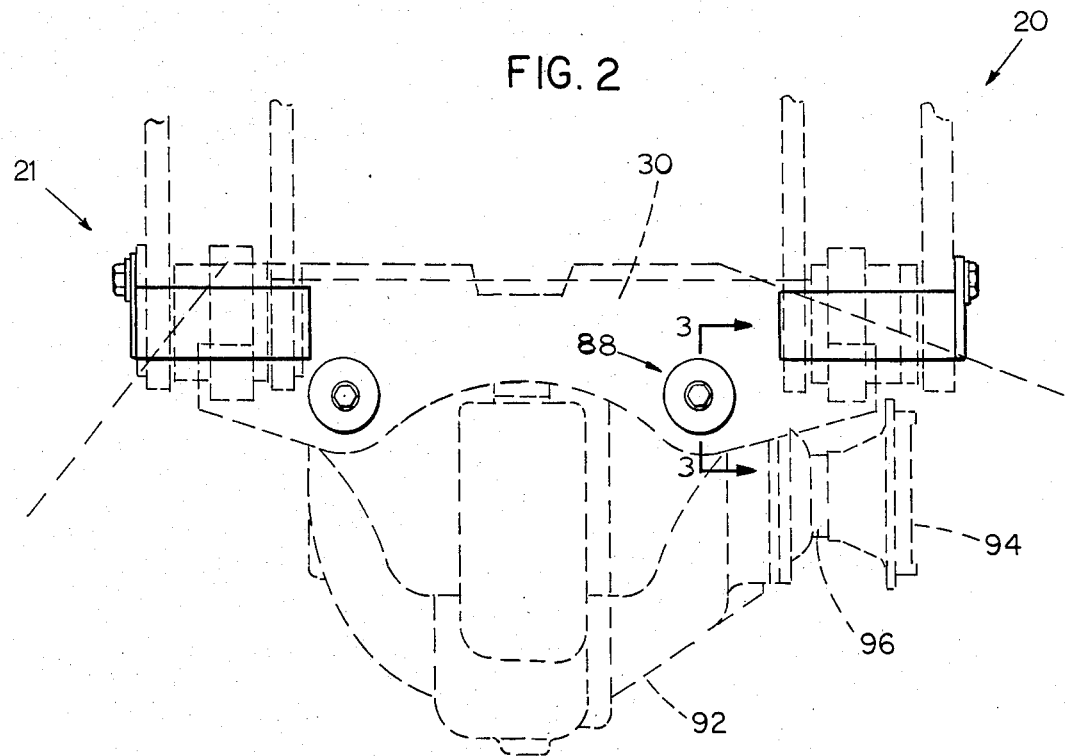
FIG. 2 is a diagrammatic view showing two of the structures of FIG. 1, one being the mirror image of the other, and additional structure of a vehicle with they may be associated.
Figure 3:
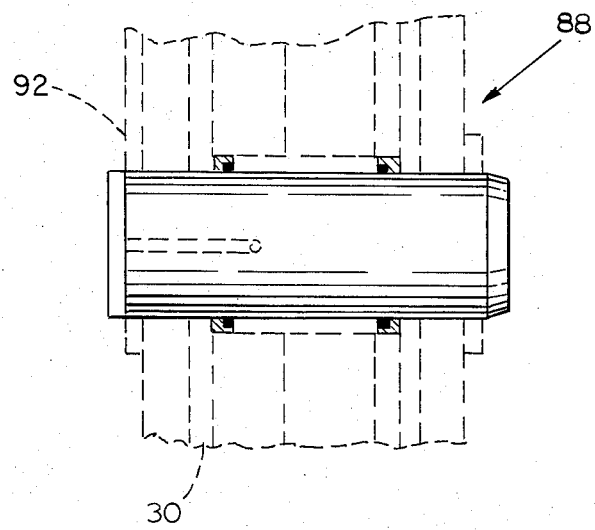
FIG. 3 is a sectional view along the line 3—3 of FIG. 2.

FIG. 2 of the drawing illustrates a portion of a vehicle which has two pivot joints embodying the present invention. One, indicated by the numeral 20 is the joint disclosed in detail herein. The other pivot joint 21 is the mirror image of joint 20. FIG. 2 also shows cradle 30 which is joined to the frame structure of the vehicle by this invention. Also illustrated in FIG. 2 is an axle housing 92 which is secured to cradle 80 and a portion 94 of a drive line which connects drive shaft 96 to be driven by the vehicle drive line. FIG. 3 is an enlarged partial view along the line 3—3 of FIG. 2 which shows one of the connections 88 between cradle 30 and axle housing 92.

While we have illustrated and described the best mode contemplated for carrying out our invention it will be appreciated that modifications may be made. Accordingly, it should be understood that we intend to cover by the appended claims all such modifications which fall within the true spirit and scope of our invention.

We claim:

1. A joint for connecting together two structural members of a vehicle for pivotal movement relative to each other, one of said structural members including a bifurcated portion having spaced apart parallel flanges, said flanges having coaxial openings therethrough, the other said structural member located in part between said parallel flanges and having a third opening therethrough coaxial with the other said openings, comprising,
    a pin extending through all three of said openings,
    a pair of bushings in said third opening and around said pin in dynamic contact with said pin,
    each bushing having an axially extending shoulder portion projecting axially beyond the ends of said third opening respectively,
    a pair of annular thrust plates housed within said shoulder portions respectively,
    a pair of annular dynamic seals between said thrust plates and said shoulder portions respectively,
    one of said thrust plates having a radially extending slot in the outer surface thereof, and
    a weld bead on one flange of said first member located in said radially extending slot.

2. A joint as in claim 1 wherein said coaxial openings through said parallel flanges are of equal diameter.

3. A joint as in claim 1 wherein one flange is rigidly connected to said pin.

4. A joint as in claim 1 wherein one flange is rigidly connected to said pin by a head portion which is welded to one end of said pin and is joined to said one flange by a machine screw connection.

5. A joint as in claim 1 wherein said joint includes at least one shim between the other said thrust plates and the other said flange.

6. A method for assembling two structural members of a vehicle for pivotal movement relative to each other, one of said structural members including a bifurcated portion having two spaced apart parallel flanges, said flanges having equal diameter coaxial openings therethrough, and the other said structural member located in part between said parallel flanges and having a third opening therethrough coaxial with the other said openings, the method comprising,
    installing a pair of annular bushings in said third opening from opposite sides of said other structural member,
    each said bushing having an axially extending shoulder portion projecting axially beyond the respective margins of said third opening,
    each of said bushings after such installation having an outwardly facing thrust surface,
    installing a pair of annular thrust plates in a manner such that each of said thrust plates abuts one of said outwardly facing thrust surfaces,
    one of said thrust plates having a radially extending slot,
    one of said bifurcated members having a weld bead arranged to mate with said slot,
    aligning said three openings coaxially with said third opening between the other two said openings by moving said weld bead through said slot, and
    inserting a pin through said three openings with said weld bead and said slot in mating relationship.

7. A method for assembling two structural members of a vehicle for pivotal movement relative to each other as in claim 6 which includes the intermediate step of installing a shim between the other of said thrust plates and the other of said flanges.

8. A method for assembling two structural members of a vehicle for pivotal movement relative to each other as in claim 7 which includes another intermediate step of installing between the other said thrust plate and the other said flange a second shim having a bendable stem portion, and bending over said tail portion to prevent circumferential movement between said second shim and said other flange.

* * * * *